Sept. 17, 1968          G. ALTMAN          3,401,592

CONTOUR PROJECTION APPARATUS

Filed Oct. 11, 1965          2 Sheets-Sheet 1

INVENTOR.
Gerald Altman
BY
Morse, Altman & Oates
ATTORNEYS

Sept. 17, 1968          G. ALTMAN          3,401,592
CONTOUR PROJECTION APPARATUS
Filed Oct. 11, 1965          2 Sheets-Sheet 2
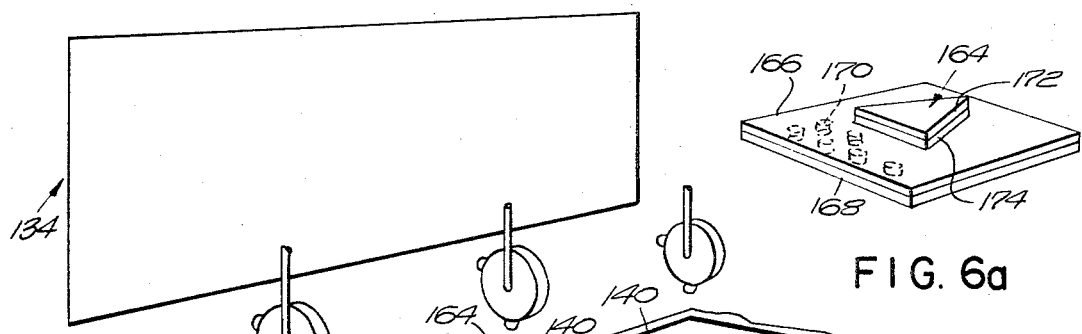
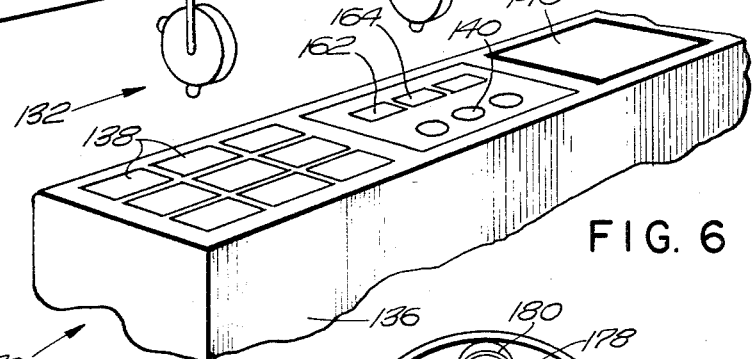
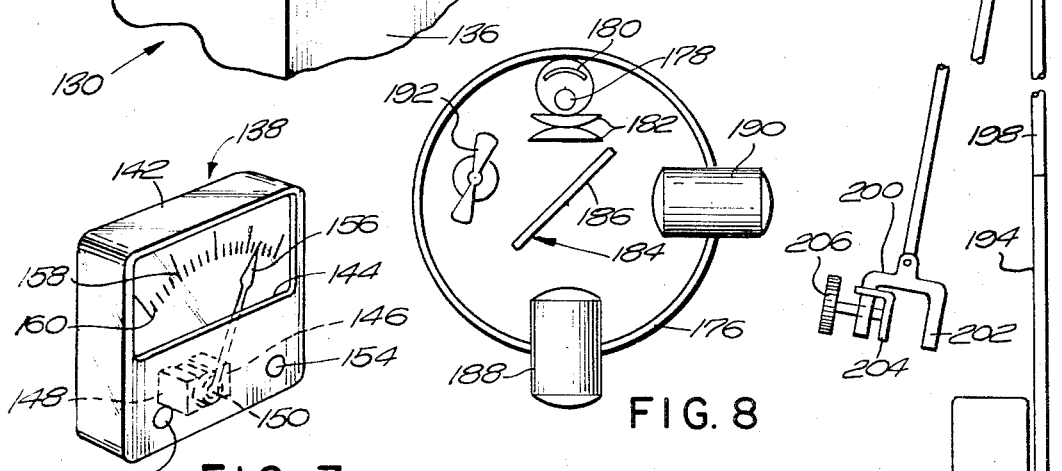
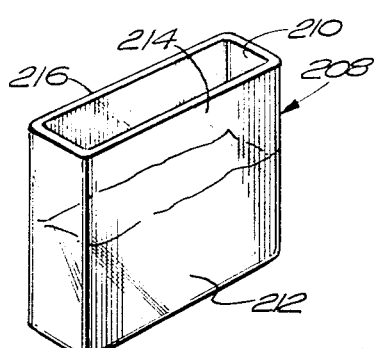
INVENTOR.
Gerald Altman
BY
Morse, Altman + Oates
ATTORNEYS United States Patent Office 3,401,592
Patented Sept. 17, 1968

3,401,592
CONTOUR PROJECTION APPARATUS
Gerald Altman, 41 Westminster Road,
Newton Center, Mass. 02159
Filed Oct. 11, 1965, Ser. No. 494,526
7 Claims. (Cl. 88—24)

ABSTRACT OF THE DISCLOSURE

An optical projection apparatus for determining the structural contours of manufactured objects. Light projected on the object is returned via a reflex reflecting stage, on which the object is positioned, to a viewing screen on which the image of the object may be compared with a standard. Polarized light may also be projected on to the object. In the instance, a reflection polarizer which serves both to direct light to the object from a source and to direct radiation from the object to the viewing screen is employed.

---

The present invention relates to the optical projection and, more particularly to the opaque projection of geometrical configurations, for example, by which the structural contours of manufactured parts may be determined for quality control, the changeable positions of instrument indicia may be determined for monitoring serveilance, etc. For various reasons opaque projection by which light returned from an opaque background (episcopic projection) rather than light directed through a transparent background (diascopic projection) is either necessary or desirable. Typically, in the contour projection of a manufactured part to be examined, the part in a support is illuminated and a greatly magnified image of its profile appears on a graduated viewing screen, by which the dimensions of the part may be determined by visual inspection. The mechanism by which the support is precisely adjustable in position or orientation may preclude a transparent background. Typically, in the visual projection of an instrument readout, e.g., an experimental galvanometer, an image of the instrument face appears on a large viewing screen for observation by a group. The circuitry by which the instrument is controlled may be so located as to preclude a transparent background. Also, in both contour projection and readout projection of the foregoing types, improved illumination efficiency has been sought as applications for opaque projection have become more diversified.

A primary object of the present invention is to enhance illumination efficiency in an opaque projection system of the foregoing type by associating the opaque background of the holder, readout or the like, with a reflex reflecting distribution which concentrates incident light on the subject and returned light from the subject into a restricted rather than a diffuse path.

Another object of the present invention is to project a visual image of a representational configuration, in terms of polarized radiation so that: relatively high efficiency of illumination is possible with the aid of a reflection polarizer, which serves both to direct light to the configuration from a source and to direct radiation from the configuration to a viewing screen from the configuration; and to utilize such a reflection polarizer simultaneously for controlled illumination of the configuration and diffuse observation of the configuration.

A further object of the present invention is to provide a magnifying, contour projector for visually presenting the contours of a minute subject via a reflex reflecting stage on which the subject is positioned and via a viewing screen on which an image of the minutes subject may be compared with available indicia.

A further object of the present invention is to provide, as a component of a system embodying the present invention, and instrument having a visual anunciator comprising indicia, which are associated with reflex reflecting material in order to intensify projection images thereof.

A further object of the present invention is to provide a novel optical projector comprising a collimator for acquiring radiation from a source, a polarizing beam splitter for optically distinguishing between radiation incident thereupon on the basis of its polarization form, a field lens assembly for directing incident radiation from the beam splitter toward a subject and for directing returned radiation from the subject to the beam splitter, and a field lens assembly for acquiring radiation from the beam splitter and projecting such radiation onto a viewing screen, the arrangement being such as to be particularly adapted for use with a substantially non-depolarizing subject.

Other objects of the present invention will in part appear hereinafter and will in part be obvious.

The invention accordingly comprises the several components and steps and their interrelationships, which are exemplified in the following detailed disclosure, the scope of which will be indicated in the appended claims.

BRIEF DESCRIPTION OF DRAWINGS

For a fuller understanding of the nature and objects of the present invention, reference should be had to the following detailed description, taken in connection with the accompanying drawing wherein:

FIG. 6 illustrates a control system embodying the present invention.

FIG. 6(a) illustrates a chart, which constitutes a component of the system of FIGURE 6;

FIG. 7 illustrates an electric meter which constitutes a component of the system of FIG. 6;

FIG. 8 is a side elevation, with cover removed and parts omitted, of a projector constituting part of the system of FIG. 6;

FIG. 9 is a front view of the projector of FIG. 8 with additional parts illustrated; and FIG. 10 is a perspective view of a further component embodying the present invention.

DETAILED DESCRIPTION

Generally, each of the two systems illustrated in FIGS. 1 to 5 and in FIGS. 6 to 9 comprises an opaque configuration sub-assembly and an opaque projection sub-assembly, at least one of which sub-assemblies is provided with quantitative indicia by which an image of the configuration may be quantitatively evaluated. The configuration sub-assembly and the projection sub-assembly are associated with a front or rear viewing screen sub-assembly. Generally, the configuration is in optical communication with minute reflex reflecting elements that are distributed in a stratum. Each reflex reflecting element ordinarily is no more than 0.1 inch in maximum extent and preferably is no more than 0.01 inch in maximum extent. Each reflex reflecting element inherently serves to acquire an original ray incident substantially from a given direction and to redirect a resulting ray substantially in the opposite direction. In the illustrated systems, special advantage is taken of polarized radiation by virtue of the fact that the reflex-reflecting elements are non-depolarizing.

Figure 1:
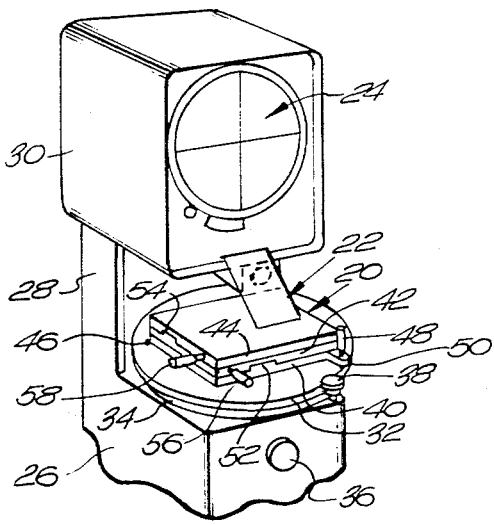
FIG. 1 is a perspective view of a contour projector embodying the present invention.

FIG. 1 illustrates a projection macroscope having an adjustable stage 20 for supporting a part to be examined, an optical path 22 for illuminating the part on stage 20 and projecting an image of its contour, and a viewing screen 24 having a face by which an image of the part is presented and indicia with which this image may be visually compared. The foregoing components are supported by a housing having a lower table portion 26, a medial cabinet portion 28 and an upper enclosure portion 30. Adjustable stage 20 is accessible, on table portion 26 and in cabinet portion 28, to an operator in order to enable positioning and orienting of stage 20 (and the part to be imaged) with respect to optical path 22. As shown, stage 20 includes a disc shaped, horizontal base 32 that is rotatable on a vertical post 34. Post 34 is vertically reciprocable within table portion 26 under the control of a micrometer 36. Horizontal base 32 is rotatable under the control of a micrometer 38. Micrometer 36 is geared to post 34 by a rack and pinion (not shown) and micrometer 38 is geared to horizontal base 32 by meshing teeth at the circular periphery of the horizontal base. Supported on horizontal base 32 are three plates 40, 42, and 44. Lower plate 40 is pivoted to horizontal base 32 at 46 so that plates 40, 42 and 44 may be rocked as a unit into a selected angular orientation under the control of a micrometer 48, the relatively movable components of which operate between an extension 50 of lower plate 40 and a bearing on horizontal base 32. Medial plate 42 is slideable on lower plate 40 via a tongue and groove conformation 52 and upper plate 44 is slidable on medial plate 42 via a tongue and groove conformation 54. The direction of motion constrained by tongue and groove 52 is perpendicular to the direction of motion constrained by tongue and groove 54. The precise positions of medial plate 42 with respect to lower plate 40 and of upper plate 44 with respect to medial plate 42 are determined by micrometers 56 and 58, each of which includes a pair of relatively adjustable parts bearing on the two plates with which they are associated. It is apparent that the precise position and orientation of the part on stage 20 may be determined by manual adjustment of micrometers 36, 38, 48, 56 and 58.

Figure 2:
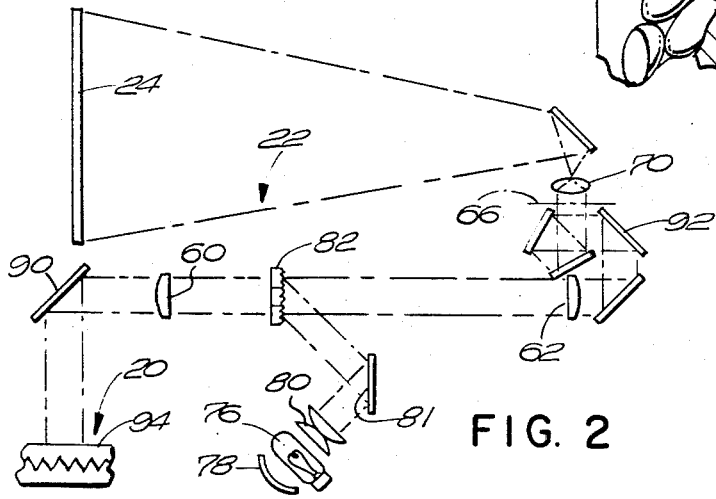
FIG. 2 is a schematic diagram of the optical layout of the projector of FIG. 1.

Optical system 22 is shown in detail in FIG. 2 as comprising a telecentric afocal relay system including a front objective lens 60 and a rear objective lens 62, which are spaced apart a distance equal to the sum of their focal lengths. The afocal system projects an aerial image of the upper face of stage 20 into an image plane 66, which is disposed at a conjugate position relative to viewing screen 24 with respect to a projection lens 70. The aerial image which is relayed by projection lens 70 from an image plane 66 to viewing screen 24, may be enlarged to any desired degree as a function of the power of projection lens 70. If desired, additional projection lenses may be alternatively inserted into the optical path to provide for different degrees of magnification. Illumination is provided by an internally mounted light source 76, which includes a curved reflector 78 and a duplet plano-convex collimator 80. The resulting collimated beam is reflected by a plane mirror 81 to a beam splitter 82, which is positioned at the stop of the afocal telecentric system. Beam splitter 82 is in the form of a centrally opened Fresnel prism, which directs the illumination into a path generally parallel to the internal optical axis of the afocal system. The illumination thus emerges through front objective 60 and is redirected toward stage 20 by a totally reflecting mirror 90. Correct presentation of the image on viewing screen 24 is effected by reflection optics generally shown at 92.

Figure 3:
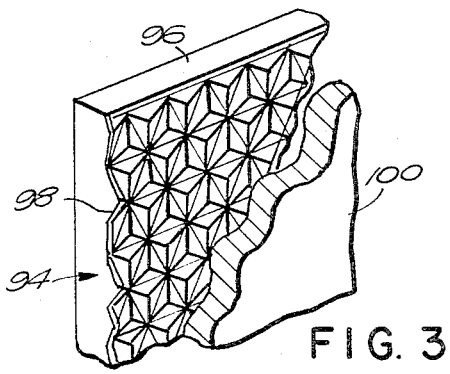
FIG. 3 is an exaggerated, perspective view of a component of the system of FIGS. 1 and 2.
Figure 4:
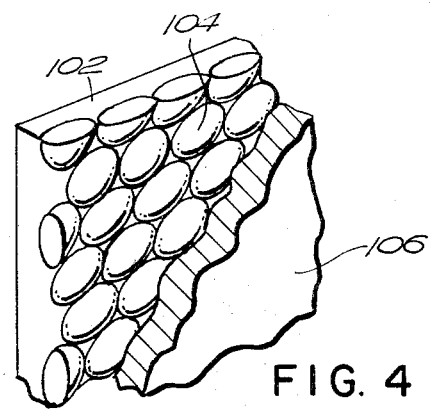
FIG. 4 is an exaggerated, perspective view of an alternative component of the projector of FIGS. 1 and 2.

In accordance with the present invention the face of stage 20 is provided with a reflex reflecting stratum shown at 94 in FIG. 2. As shown in FIG. 3, reflex reflecting stratum 94 includes a lower stratum 96, the upper face of which presents a multiplicity of minute cube corners 98 that are embossed in backing stratum 96 and metallized. For example the cube corners are approximately ⅛ inch in maximum extent and are metallized with a coating of aluminum or silver approximately 0.0001 inch thick. At the upper face of reflex reflecting plate 94 is a transparent support 100, composed for example of a rigid plastic such as methyl methacrylate or a vitreous material such as glass or quartz. An alternative reflex reflecting plate is shown in FIG. 4 as comprising a base stratum 102, a reflex reflecting stratum 104, composed of a multiplicity of minute reflex reflecting microspheres, and a protective transparent stratum 106, analogous to stratum 100 of FIG. 3. Each of the reflex reflecting spheres of stratum 104, which may be composed of glass, constitutes a lens having opposed spherical surfaces, one of which acquires radiation from substantially any given direction for transmission through the lens and the other of which is contiguous with a reflective metal interface that redirects the radiation through the lens in substantially the opposite direction. Such a reflex reflecting stratum is disclosed in: U.S. Patent No. 2,997,403, issued Aug. 22, 1961 in the name of Charles E. Seright for Reflex Reflective Coating Composition; and U.S. Patent No. 2,963,378 issued Dec. 6, 1960 in the name of Philip V. Palmquist for Glass Beads Hemispherically Reflectorized With Metallic Coating and Compositions Thereof. Base stratum 102 and support stratum 106 preferably are composed of a plastic having a sharply different index of refraction with respect to the index of refraction of the glass spheres in stratum 104.

Figure 5A:
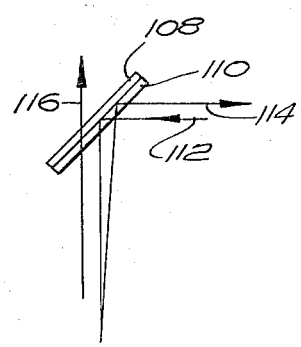
FIGS. 5(a) and (b) are modified portions of the optical layout of FIG. 2.
Figure 5B:
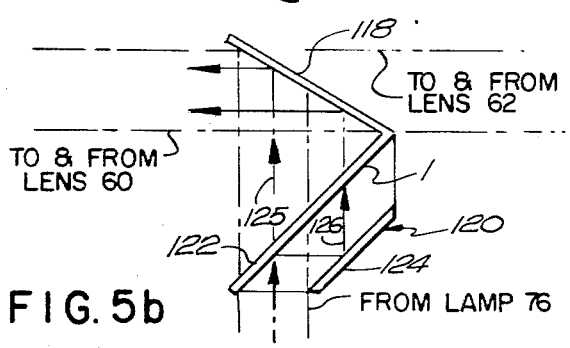

In a modification of the optical system of FIG. 2, advantage is taken of polarized radiation by substituting reflecting polarizers for mirrors 81 and 90 and the reflex reflector of FIG. 4 for that of FIG. 3 as indicated above. The reflecting polarizer at the position of mirror 81 provides linearly polarized radiation. The reflecting polarizer at the position of mirror 90, together with a quarter wave plate at its lower face, converts the linearly polarized radiation to circularly polarized radiation for illumination of stage 20 and redirects the resulting reverse circularly polarized radiation back through the optical system for imaging on screen 24. Since the reflex reflecting stratum is non-depolarizing, the reflection efficiency of the polarizing reflector at the position of reflector 90 is very high. At the same time, since the polarizing reflector at the position of reflector 90 is transparent to a component of diffuse radiation, the part on stage 20 may be viewed directly by an observer through the polarizing reflector and the quarter wave plate. The modification of mirror 90 is shown in FIG. 5(a) as including a polarizing reflector 108 and quarter wave plate 110. The collimated incident beam is shown at 112, the reflex reflected beam is shown at 114 and the diffuse radiation is shown at 116. An alternative modification, which retains totally reflecting mirror 90 but which replaces beam splitter 82, is shown at FIG. 5(b) as including a polarizing reflector 118 in the main optical path between front lens 60 and rear lens 62, and a beam splitter generally shown at 120 in the form of an isosceles trapezoid having parallel front and rear faces 122 and 124 at 45° with respect to the axis of collimated light from the illumination source. At face 122 is a rearward reflector polarizing stratum and a forward quarter wave stratum. At face 124 is a forward quarter wave stratum and a rearward metallic reflecting stratum. The arrangement is such that one half the optical field is illuminated by a polarized beam 125 and the other half the optical field is illuminated by a polarized beam 126. Both beams 125 and 126 are circularly polarized by the quarter wave stratum at face 122 so as to be reflected at face 122 when returned from stage 20.

The system of FIG. 6 includes an industrial control console 130, a series of optical projectors 132 and a viewing screen 134. Console 130 includes an enclosed housing 136, at the upper face of which are a series of meters 138 and a series of charts 140, both of which are associated with reflex reflecting surfaces of the type described in connection with FIGS. 3 and 4. Projectors 132 direct illuminating radiation toward meters 138 and charts 140 and direct imaging radiation to screen 134 for observation by a group.

By way of illustration, each of meters 138 is shown in FIG. 7 as including a suitable housing 142 having a window 144. Within the housing is a d'Arsonval movement, shown in dashed lines as including a pair of permanent magnetic armatures 146, 148 and a pivoted coil 150, which is energized by direct current applied to a pair of terminals 152, 154. Affixed to coil 150 and pivotal therewith is a pointer 156 which cooperates with indicia 158 on a graduated face 160. Graduated face 160 is provided with a reflex reflecting stratum corresponding to stratum 98 of FIG. 3 or stratum 104 of FIG. 4. Each of charts 140 is provided with a series of permanently affixed representations 162 and interchangeable representations 164, each of which has a reflex reflecting stratum capable of returning a distinctive hue of light when illuminated with white light. As shown in FIG. 6a, chart 140 has an upper stratum 166 as a support and a lower stratum 168 in which are distributed an array of magnetic discs 170. Representation 164, which is shown as corresponding in shape to the electronic schematic form of an operational amplifier, has: an upper stratum 172 composed of a reflex reflecting distribution of the type shown in FIGS. 3 and 4 above; and a lower stratum 174 composed of a magnetic metal foil, e.g. stainless steel. It is apparent that representation 164 may be moved or replaced at will but retained in place securely by the action of magnetic discs 170 on magnetic metal foil 174.

Each of projectors 132 is shown in FIG. 8 as including a housing 176, within which the optical components are supported and enclosed. The white illumination source is shown as being an incandescent tungsten lamp 178 having within its evacuated envelope a reflector 180. A duplet of condenser lenses 182, 182 collimate the light from source 178 for incidence on a beam splitter 184. Beam splitter 184 is shown simply as an upper reflection polarizing stratum and a lower quarter wave stratum, which transmit approximately 50 percent of radiation from lamp 178 in an initial form, circularly polarized in one direction, and which reflect the radiation so transmitted in a final form, circularly polarized in the opposite direction. The change from the initial form to the final form occurs upon reflection, the initial form being projected by an objective lens 188 to console 130 and the final form being projected by an objective lens 190 to screen 134. A suitable fan 192 is provided to cool the inside of the housing in order to avoid excess heating by lamp 178. As shown in FIG. 9, a bracket 194 is pivoted to the housing at 196, being provided with universally rotatable and pivotable, telescoping tubes 198. At the free extremity of bracket 194 is a clamp 200 having a fixed jaw 202 and a manually controlled jaw 204, which is controlled by a knurled knob 206.

In operation of the system of FIG. 6, analog signals from apparatus under observation are applied to meters 138. In each meter, the profile of pointer 156 and of indicia 158 are displayed against the bright background provided by reflex reflecting face 160. Also displayed are the representations 162 and 164 of charts 140. The system of FIG. 6 is analogous to a variety of other control ssytems of the types used in railroad logistics, military command, etc. Alternatively, the system of FIG. 6 may be applied in educational exhibit systems, in which visual experimentation is presented for classroom observation. A product of use in the latter application, for example, is illustrated in FIG. 9 as a container 208 having an open top 210 through which a fluid 212 (undergoing a chemical reaction) may be poured and processed, a forward face 214 and a rearward face 216. Rearward face 216 is provided with a reflex reflecting material of the type shown at 98 in FIG. 3 and 104 in FIG. 4 so that white light illuminating fluid 212 through front face 214 is returned by reflex reflecting stratum 216 to the optical system for projection.

CONCLUSION

The present invention thus provides a variety of display systems characterised by opaque annunciating faces, which may be projected with high illumination efficiency. Since said changes may be made in the foregoing disclosure without departing from the scope of the invention herein, it is intended that all matter contained in the above description or shown in the accompanying drawings be interpreted in an illustrative and not a limiting sense.

What is claimed is:

1. A display system comprising annunciating means characterized by an optical field, projecting means for illuminating said annunciating means with illuminating radiation from a source and for imaging said annunciating means with imaging radiation from said annunciating means, and viewing means for presenting an image of said optical field, said annunciating means including background means and foreground means which are relatively movable with respect to each other, said annunciating means including reflex reflecting means optically distinguishing between said background means and said foreground means, said reflex reflecting means establishing a path for said illuminating radiation and said imaging radiation, said projecting means including means for directing said illuminating radiation into said path toward said annunciating means and means for directing said imaging radiation from said path toward said viewing means, said annunciating means being constituted by said foreground means and said background means, said foreground means being a pointer and said background means being graduations.

2. An information display system comprising housing means for presenting a relatively restricted visual field, a multiplicity of reflex reflecting elements optically communicating with said relatively restricted visual field, each of said reflex reflecting elements inherently establishing a selected substantially common path for an incident pencil of rays directed thereto and for a resulting pencil of rays directed therefrom, said substantially common path characteristically being substantially dependent on the direction of said path and characteristically being substantially independent of the angle between said path and said visual field, source means for generating illuminating light, projection means including transmitting-reflecting means for directing said illuminating light to said visual field and for producing in terms of light from said reflex reflecting elements a relatively magnified image of at least portions of said visual field, a viewing screen for presenting said relatively magnified image for observation, and changeable means in the form of an indicia indicator in said relatively restricted visual field, said indicia indicator including visual means constrained for movement relative to said housing means in contiguity with said multiplicity of reflex reflecting elements, and actuating means including electromechanical means for controlling said movement, said indicia indicator being presented for visual observation directly and for episcopic projection via said transmitting-reflecting means.

3. An information display system comprising base means for presenting a relatively restricted visual field, reflex reflecting means optically communicating with said relatively restricted visual field, source means for directing light toward said reflex reflecting means, projection means for producing in terms of light from said reflex reflecting means a relatively magnified image of at least portions of said visual field, a viewing screen for presenting said relatively magnified image for observation, and changeable means for selectively relating a visual subject to said base means in said relatively restricted visual field, said changeable means being a mounting stage capable of tilting out of the plane that is perpendicular to the axis of said light between said source means and said reflex reflecting means, whereby light is returned along said axis by said reflex reflecting means within a range of angles between said mounting stage and said axis.

4. An information display system comprising base means for presenting a relatively restricted visual field, reflex reflecting means optically communicating with said relatively restricted visual field, source means for directing light toward said reflex reflecting means, projection means for producing in terms of light from said reflex reflecting means a relatively magnified image of at least portions of said visual field, a viewing screen for presenting said relatively magnified image for observation, and changeable means for selectively relating a visual subject to said base means in said relatively restricted visual field, said changeable means including first magnetic means affixed to said base means and second magnetic means affixed to said visual subject in order to adjustably secure said visual subject to said base means in said visual field.

5. An optical gauging device comprising a platform for sequentially supporting one of a sequence of relatively small subjects to be examined, a reflex reflecting stratum at said platform for optical communication with said one of said subjects, an illumination source for generating light, a transmitting-reflecting system for directing light from said source to said reflex reflecting stratum along an axis, a projection lens system for producing a relatively large image of said one of said subjects in terms of light from said reflex reflecting stratum redirected by said transmitting-reflecting system, a display for presenting said relatively large image for viewing, indicia associated with said display for association with said relatively large image, and precision means for selectively moving said platform with respect to said axis, said precision means including orientation adjusting means for selectively varying the angle of the plane of said platform with respect to said axis in to skew orientations, in connection with which the direction of light returned by said reflex reflecting stratum remains constant.

6. A d'Arsonval meter comprising a housing, armature means and coil means within said housing of which one means is fixed to said housing and the other means is pivoted with respect thereto, said armature means and said coil means being in electromagnetic association, first index means stationary with said one means and second index means stationary with said other means, said first index means and said second index means being in visual cooperation, and reflex reflecting means in contiguous cooperation with said first index means and said second index means, said reflex reflecting means enabling direct visual observation of said first index means and said second index means and enabling optical projection of an image of said first index means and said second index means in terms of light directed to said first index means and said second index means by a transmitting-reflecting means and light directed from said first index means and said second index means by said transmitting-reflecting means.

7. An optical gauging device comprising a platform for sequentially supporting one of a sequence of relatively small subjects to be examined, a non-depolarizing reflecting stratum at said platform for optical communication with said one of said subjects, an illumination source for generating light, beam control means providing an interface for transmitting a large proportion of polarized light of one character and for reflecting a large proportion of polarized light of another character, at least a proportion of said light in polarized form being directed by said beam control means along an axis to said non-depolarizing reflecting stratum and being redirected by said non-depolarizing reflecting stratum along said axis to said beam control means, retardation means associated with said beam control means and said non-depolarizing stratum means for changing the polarization character of said light when reflected by said non-depolarizing reflecting means, a projection lens system for producing a relatively large image of said one of said subjects in terms of light from said non-depolarizing reflecting stratum by said transmitting reflecting system, and a display for presenting said relatively large image for viewing.

References Cited

UNITED STATES PATENTS

| | | | |
|---|---|---|---|
| 2,549,574 | 4/1951 | Condiff | 88—14 |
| 3,340,765 | 9/1967 | Herriott | 88—26 |
| 2,167,149 | 7/1939 | Grote | 350—103 |
| 2,414,871 | 1/1947 | Harper | 88—24 |
| 3,099,185 | 7/1963 | Meltzer | 88—24 |
| 3,127,810 | 4/1964 | Gottlieb | 88—24 |
| 3,205,768 | 9/1965 | Coombs et al. | 88—24 |
| 3,277,782 | 10/1966 | Smith | 350—147 |
| 3,285,126 | 11/1966 | Lucas | 88—240 |
| 3,310,900 | 3/1967 | Hamilton et al. | 350—105 X |

NORTON ANSHER, *Primary Examiner.*

R. M. SHEER, *Assistant Examiner.*